W. E. MOELLER.
NUT LOCK.
APPLICATION FILED SEPT. 27, 1915.

1,207,597.

Patented Dec. 5, 1916.

William E. Moeller
INVENTOR.

BY
ATTORNEYS.

UNITED STATES PATENT OFFICE.

WILLIAM E. MOELLER, OF CHICAGO, ILLINOIS.

NUT-LOCK.

1,207,597.　　　　Specification of Letters Patent.　　Patented Dec. 5, 1916.

Application filed September 27, 1915. Serial No. 52,911.

*To all whom it may concern:*

Be it known that I, WILLIAM E. MOELLER, a citizen of the United States, residing at Chicago, in the county of Cook and State of Illinois, have invented certain new and useful Improvements in Nut-Locks, of which the following is a specification.

This invention relates to devices for locking nuts on their bolts to prevent the same from turning and backing off to release the parts to which said nuts and bolts are applied.

It is the object of the invention to provide a simple and efficient device whereby the nut is securely locked on the bolt, the same consisting in a novel combination and arrangement of parts to be hereinafter described and claimed.

In order that the invention may be better understood reference is had to the accompanying drawing, in which—

Figure 1:
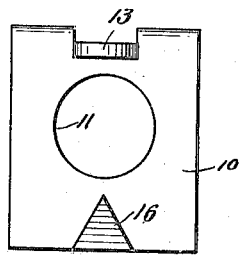
Figure 2:
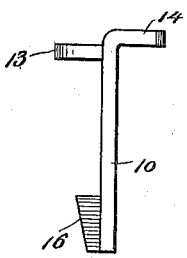
Figure 3:
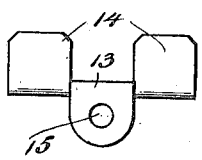
Figure 4:
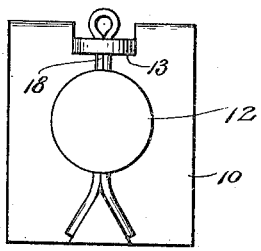
Figure 5:
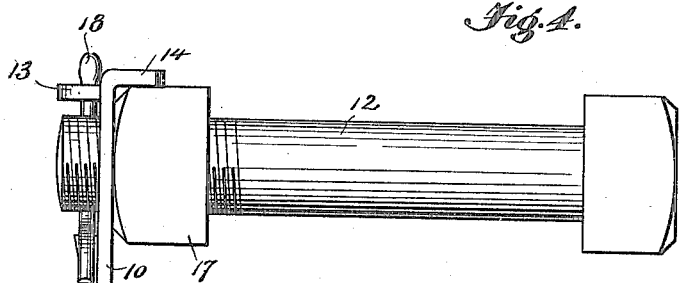

Figure 1 is a face view of the locking device; Fig. 2 is an edge view thereof; Fig. 3 is an end view; Fig. 4 is an end view of a bolt showing the locking device in position thereon, and Fig. 5 is a side elevation of a bolt and its nut showing the locking device applied thereto.

Referring specifically to the drawing, the locking device comprises a rectangular metal plate 10 having a central bolt hole 11 so that it may be slipped on the shank 12 of the bolt, and provided with means for locking the nut 17 which is screwed on said bolt shank. One edge of the plate is slitted and bent to form two spaced, laterally outstanding end flanges 14 and a lateral outstanding medial flange 13 therebetween. The flanges 14 extend in the same direction from one side of the plate and the flange 13 extends in the opposite direction. The flange 13 has an aperture 15. Adjacent to the edge of the plate which is opposite the flanged edge, and on the same side of the plate as the flange 13, is a raised portion or lug 16 the opposite sides of which diverge outward. The bolt is transversely apertured to receive an ordinary split cotter pin.

The plate 10 is slipped on the bolt shank 12 after the nut 17 has been advanced to the desired position. The plate is placed against the outer face of the nut. The flanges are positioned on the plate and the latter is dimensioned so that the flanges 14 engage one of the side faces of the nut as shown in Fig. 5. The aperture in the bolt shank for the cotter pin 18 is in line with the aperture 15, and the apex of the lug 16 is also in line with these apertures. It will, therefore, be seen that when the cotter pin is driven through said apertures, its legs are spread by the lug 16 as shown in Figs. 4 and 5, and it is thus locked against accidental withdrawal. It will be evident from the foregoing that the plate 10 is locked on the bolt shank 12 by the cotter pin 19, and the flanges 14 lock the nut and prevent same from turning on the bolt shank, and the parts therefore form a simple and efficient nut lock.

I claim:—

1. The combination with a bolt and its nut; of a lock for the nut, said lock comprising a plate opposite the outer face of the nut and having an aperture to receive the bolt, said plate also having an outstanding flange engageable with the side of the nut, and an outstanding apertured flange extending in the opposite direction from said nut-engaging flange, and the face of the plate on the same side as the second-mentioned flange having a lug the sides of which diverge outwardly, and a split pin passing transversely through the bolt and through the aperture of the second-mentioned flange and engageable with the lug to spread its legs.

2. The combination with a bolt and its nut; of a split pin passing transversely through the bolt ahead of the nut, and a member mounted on the bolt between the nut and the pin and anchored to the latter, said member having means for spreading the legs of the pin.

3. The combination with a bolt and its nut; of a split pin passing transversely through the bolt, a locking plate anchored to the pin and having a flange engaging the side of the nut, and means on the plate for spreading the legs of the pin.

4. The combination with a bolt and its nut; of a split pin passing transversely through the bolt, a member mounted on the bolt and anchored to the pin, said member having means for spreading the legs of the pin, and means on said member for coupling the same and the nut together.

5. The combination with a bolt and an element carried thereby; of a split pin passing transversely through the bolt, and a member mounted on the bolt and anchored to the pin, said member having means for spreading the legs of the pin, and means for coupling the aforesaid element and the member together.

6. The combination with a bolt and an element carried thereby; of a split pin passing transversely through the bolt ahead of said element, and a member mounted on the bolt between the element and the pin and anchored to the latter, said member having means for spreading the legs of the pin.

7. The combination with a bolt and an element carried thereby; of a split pin passing transversely through the bolt, a member anchored to the pin and having a flange engaging the side of the aforesaid element, and means on the member for spreading the legs of the pin.

8. The combination with a bolt and a split pin passing transversely therethrough; of a member mounted on the bolt and having an outstanding apertured flange, the aforesaid pin passing through the aperture of the flange, and means on the member for spreading the legs of the pin.

In testimony whereof I affix my signature.

WILLIAM E. MOELLER.

Copies of this patent may be obtained for five cents each, by addressing the "Commissioner of Patents, Washington, D. C."